United States Patent
Rana et al.

(10) Patent No.: US 11,126,946 B2
(45) Date of Patent: Sep. 21, 2021

(54) OPPORTUNITY DRIVEN SYSTEM AND METHOD BASED ON COGNITIVE DECISION-MAKING PROCESS

(71) Applicant: Diwo, LLC, Northville, MI (US)

(72) Inventors: Satyendra Pal Rana, Northville, MI (US); Chandra Puttanna Keerthy, Northville, MI (US); Krishna Prakash Kallakuri, Northville, MI (US)

(73) Assignee: DIWO, LLC, Northville, MI (US)

( * ) Notice: Subject to any disclaimer, the term of this patent is extended or adjusted under 35 U.S.C. 154(b) by 1008 days.

(21) Appl. No.: 15/788,232

(22) Filed: Oct. 19, 2017

(65) Prior Publication Data

US 2018/0114121 A1 Apr. 26, 2018

Related U.S. Application Data

(60) Provisional application No. 62/410,708, filed on Oct. 20, 2016.

(51) Int. Cl.
| | |
|---|---|
| *G06Q 10/06* | (2012.01) |
| *G06N 20/00* | (2019.01) |
| *G06N 5/04* | (2006.01) |
| *G06K 9/00* | (2006.01) |

(52) U.S. Cl.
CPC .......... *G06Q 10/0639* (2013.01); *G06N 5/04* (2013.01); *G06N 20/00* (2019.01); *G06K 9/0051* (2013.01)

(58) Field of Classification Search
CPC ...... G06Q 10/0639; G06N 5/022; G06N 5/04; G06N 20/00; G06K 9/0051
See application file for complete search history.

(56) References Cited

U.S. PATENT DOCUMENTS

| | | | |
|---|---|---|---|
| 10,380,265 B2* | 8/2019 | Martinez Corria | ..... G06F 40/58 |
| 2003/0212584 A1 | 11/2003 | Flores | |
| 2006/0085205 A1 | 4/2006 | Kumar | |
| 2016/0048648 A1 | 2/2016 | Sanchez et al. | |
| 2016/0170974 A1* | 6/2016 | Martinez Corria | ..... G06F 40/58 704/4 |
| 2018/0046957 A1* | 2/2018 | Yaari | ................... G06Q 10/1095 |

OTHER PUBLICATIONS

Vesa Puhakka, "Developing a Creative-Cognitive Model of Entrepreneurial Alertness to Business Opportunities, Journal of Management and Strategy", Dec. 15, 2011.
IBM Watson: "How It Works" Link—https://www.youtube.com/watch?v=_Xcmh1LQB9I, Oct. 7, 2014.

* cited by examiner

*Primary Examiner* — Stanley K. Hill
(74) *Attorney, Agent, or Firm* — FisherBroyles, LLP; Susan M. Oiler

(57) ABSTRACT

The present disclosure relates to system(s) and method(s) for continuous business optimization of an organization based on a cognitive decision making process. In one embodiment, the method comprises generating an opportunity instance package associated with a business opportunity from a set of business opportunities associated with an organization based on analysis of a stream of raw data. Further, the method comprises generating a strategy using the opportunity instance package and one or more of a predictive technique, prescriptive technique and optimization technique. Furthermore, the method comprises generating a set of instruction associated with one or more actors associated with the organization based on the strategy, thereby enabling continuous business optimization of the organization based on a cognitive decision-making process.

18 Claims, 4 Drawing Sheets

OPPORTUNITY DRIVEN SYSTEM AND METHOD BASED ON COGNITIVE DECISION-MAKING PROCESS

CROSS REFERENCE TO RELATED APPLICATIONS

This patent application claims priority from U.S. Provisional Application No. 62/410,708 filed on Oct. 20, 2016, the entirety of which is hereby incorporated by reference.

TECHNICAL FIELD

The present disclosure in general relates to the field of cognitive computing. More particularly, the present subject matter relates to an opportunity driven system and a method for continuous business optimization of an organization based on a cognitive decision-making process.

BACKGROUND

In the current increasingly complex global economy, to survive and grow, businesses strive to find new method to improve performance and competitiveness. Traditionally, businesses have improved business performance by streamlining their processes until the focus shifted to customer relationships dimension. Currently, the focus/trend has shifted once again to leveraging big data and advanced analytics. The trend has been fueled by digitization, internet of things, and developments in advanced analytics and the understanding that data has knowledge trapped inside it, unlocking of which is the key to the source for improving performance and competitiveness.

Typically, conventional business improvement initiatives are predominantly driven by the notion of quality. These conventional method and systems track defects in processes, and generate KPI's (key performance indicators) based on quality driven metrics and measurements. Conventional business improvement initiatives fail when challenged by the need for business agility and the resulting imperative to function effectively in spite of imperfect information and/or processes. Further, most conventional method and systems do not lend themselves well to the context of big data and the immediate and significant impact of a real-time fluctuation in business. Furthermore, the conventional method and systems the lack a coherent framework for business performance optimization that incorporates big data and advanced analytics at its core. The need for new method and systems is much more acute for businesses, which have a higher degree of sensitivity to variations in their operating and contextual environment.

SUMMARY

Before the present an opportunity driven system and a method for continuous business optimization of an organization based on a cognitive decision-making process, are described, it is to be understood that this application is not limited to the particular systems, and methodologies described, as there can be multiple possible embodiments, which are not expressly illustrated in the present disclosures. It is also to be understood that the terminology used in the description is for the purpose of describing the particular implementations, versions, or embodiments only, and is not intended to limit the scope of the present application. This summary is provided to introduce aspects related to a system and a method for continuous business optimization of an organization based on a cognitive decision-making process. This summary is not intended to identify essential features of the claimed subject matter nor is it intended for use in determining or limiting the scope of the claimed subject matter.

In one embodiment, a method for continuous business optimization of an organization based on a cognitive decision-making process is disclosed. In the embodiment, the method comprises the step of generating an opportunity instance package associated with a business opportunity from a set of business opportunities associated with an organization based on analysis of a stream of raw data. In one example, the generating may comprise the steps of receiving the stream of raw data from one or more sources internal or external to the organization and generating an opportunity input data package based on analysis of the stream of raw data using one or more predefined instructions. In the example, the one or more predefined instructions may comprise one or more data structures, and one or more pattern recognition algorithm associated with a business opportunity. In one other example, the generating may comprise the steps of filtering a noise data from the stream of raw data using the one or more pattern recognition algorithm and reorganizing the filtered data using the one or more data structures. In the example, upon generating the method comprises identifying the business opportunity for the set of business opportunities based on analysis of the opportunity input data package. In one other example, the analysis comprises one or more of a time-series analysis, an incremental analysis, a prediction model, a computational model and the prediction model and the computational model may be generated using a machine learning methodology and historical data. Further to generating the opportunity instance package the method comprises generating a strategy using the opportunity instance package and one or more of a predictive technique, prescriptive technique and optimization technique. Upon generating the strategy, the method comprises generating a set of instruction associated with one or more actors associated with the organization based on the strategy, thereby enabling continuous business optimization of an organization based on a cognitive decision-making process. In one example, the one or more actors may be one of an employee of the organization, or a computer program associated with the organization.

In another embodiment, an opportunity driven system for continuous business optimization of an organization based on a cognitive decision-making process is disclosed. The opportunity driven system comprises a memory and a processor coupled to the memory, further the processor may be configured to execute programmed instructions stored in the memory. In one embodiment, the opportunity driven system may generate an opportunity instance package associated with a business opportunity from a set of business opportunities associated with an organisation based on analysis of a stream of raw data. In one example, the generating may comprise receiving the stream of raw data from one or more sources internal or external to the organization and generating an opportunity input data package based on analysis of the stream of raw data using one or more predefined instructions. In the example, the one or more predefined instructions may comprise one or more data structures, and one or more pattern recognition algorithm associated with a business opportunity. In one other example, the generating may comprise the steps of filtering a noise data from the stream of raw data using the one or more pattern recognition algorithm and reorganizing the filtered data using the one or more data structures. In the example, upon generating an opportunity input data package, generating of the opportunity instance package comprises identifying the business opportunity for the set of business opportunities based on analysis of the opportunity input data package. In one other example, the analysis comprises one or more of a time-series analysis, an incremental analysis, a prediction model, a computational model and the prediction model and the computational model may be generated using a machine learning methodology and historical data. Further to generating the opportunity instance package, the system may generate a strategy using the opportunity instance package and one or more of a predictive technique, prescriptive technique and optimization technique. Subsequent to generating a strategy, the opportunity driven system may generate a set of instruction associated with one or more actors associated with the organization based on the strategy, thereby enabling continuous business optimization of an organization based on a cognitive decision making process. In one example, the one or more actors is one of an employee of the organization, or a computer program associated with the organization.

In yet another implementation, non-transitory computer readable medium embodying a program executable in a computing device for reflective learning in a cognitive decision-making is disclosed. The program may comprise a program code for generating an opportunity instance package associated with a business opportunity from a set of business opportunities associated with an organization based on analysis of a stream of raw data. In one example, the generating may comprise the steps of receiving the stream of raw data from one or more sources internal or external to the organization and generating an opportunity input data package based on analysis of the stream of raw data using one or more predefined instructions. In the example, the one or more predefined instructions may comprise one or more data structures, and one or more pattern recognition algorithm associated with a business opportunity. In one other example, the generating may comprise the steps of filtering a noise data from the stream of raw data using the one or more pattern recognition algorithm and reorganizing the filtered data using the one or more data structures. In the example, upon generating, the program may comprise a program code for identifying the business opportunity for the set of business opportunities based on analysis of the opportunity input data package. In one other example, the analysis comprises one or more of a time-series analysis, an incremental analysis, a prediction model, a computational model and the prediction model and the computational model may be generated using a machine learning methodology and historical data. Further to generating the opportunity instance package, the program may comprise a program code for generating a strategy using the opportunity instance package and one or more of a predictive technique, prescriptive technique and optimization technique. Upon generating the strategy, the program may comprise a program code for generating a set of instruction associated with one or more actors associated with the organization based on the strategy, thereby enabling continuous business optimization of an organization based on a cognitive decision-making process. In one example, the one or more actors may be one of an employee of the organization, or a computer program associated with the organization.

BRIEF DESCRIPTION OF THE DRAWINGS

The foregoing detailed description of embodiments is better understood when read in conjunction with the appended drawings. For the purpose of illustrating of the present subject matter, an example of construction of the present subject matter is provided as figures. However, the present subject matter is not limited to the specific a system and a method for continuous business optimization of an organization based on a cognitive decision-making process, disclosed in the document and the figures.

The present subject matter is described detail with reference to the accompanying figures. In the figures, the leftmost digit(s) of a reference number identifies the figure in which the reference number first appears. The same numbers are used throughout the drawings to refer various features of the present subject matter.

Figure 1:
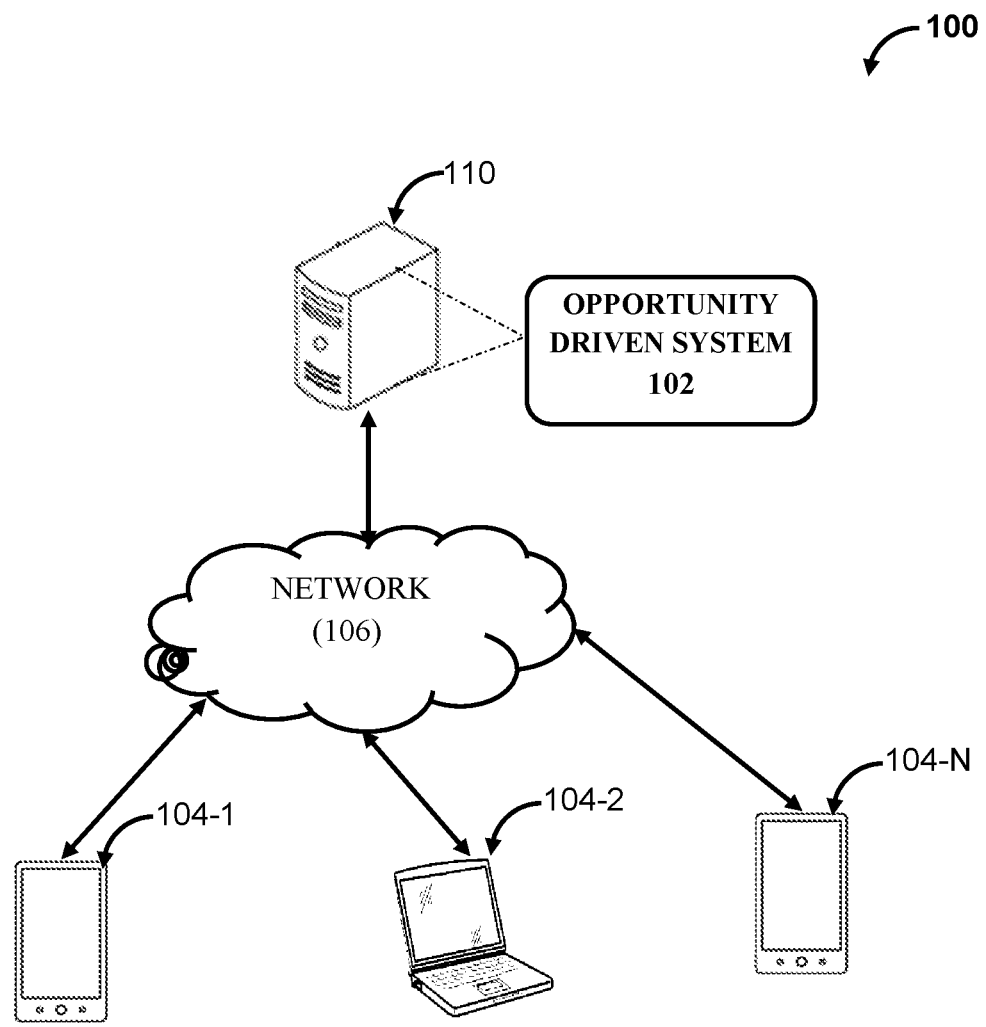
FIG. 1 illustrates an embodiment of a network implementation of a opportunity driven system for continuous business optimization of an organization based on a cognitive decision making process, in accordance with an embodiment of the present subject matter.

The figures depict an embodiment of the present disclosure for purposes of illustration only. One skilled in the art will readily recognize from the following discussion that alternative embodiments of the system and method 102 for continuous business optimization of an organization based on a cognitive decision-making process illustrated herein may be employed without departing from the principles of the disclosure described herein.

DETAILED DESCRIPTION

Some embodiments of this disclosure, illustrating all its features, will now be discussed in detail. The words "comprising," "having," "containing," and "including," and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any, a system and a method for continuous business optimization of an organization based on a cognitive decision-making process, similar or equivalent to those described herein can be used in the practice or testing of embodiments of the present disclosure.

Various modifications to the embodiment will be readily apparent to those skilled in the art and the generic principles herein for continuous business optimization of an organization based on a cognitive decision-making process may be applied to other embodiments. However, one of ordinary skill in the art will readily recognize that the present disclosure for continuous business optimization of an organization based on a cognitive decision-making process is not intended to be limited to the embodiments described, but is to be accorded the widest scope consistent with the principles and features described herein.

In the present disclosure, a business opportunity may be understood as a transient circumstance that comes along the way of a business operation and which needs to be handled strategically in order to promote the business. In other words, the business opportunity may be understood as an opportunity for an organization to gain a profit, reduce a loss, or maintain its hold in the market. Though organization identify these business opportunities, however identifying these business opportunities in real time or even predicting the business opportunities is the key to success. It may be noted that the system may identify a business opportunity for which a strategy may be implemented. However, the strategy needs to be implemented on time by a decision maker so as to achieve the designated goal. Therefore, it becomes further important to provide a rationale, an impact and act by date along with the description of the business opportunity for the generating of a strategy in a cognitive decision-making process.

Herein, few definitions are introduced that are helpful in describing the continuous business optimization problem as conceptualized by the present subject matter. In what follows, the word 'business' means a business entity, or the concept of conducting business which should be clear from the context of its use.

Business Performance Management: Business performance management is a set of processes that enables the management of a business entity to achieve one or more clearly defined business goals.

Business Performance Metrics: Business performance metrics are used to quantify the progress against one or more business goals. Business performance metrics drive performance measurements and analytic processes. Actual values of these metrics at a point in time are also called as key performance indicators (KPIs) of business performance.

Business Performance Optimization: Business performance optimization refers to method 102, processes, policies, and systems that result into optimal progress against business goals. Business Performance Optimization is about finding the best answers to these two questions.

Continuous Business Performance Optimization: Continuous business performance optimization refers to repeated application of business performance optimization method 102 to make continued progress toward business goals.

Business State: Business State is captured by a set of KPI's (aka variables), the values of which collectively indicate the progress toward business goals at a point in time.

Business State Invariant: A Business State Invariant is a logical expression (evaluates to true or false) over business state variables.

In one example of Cognitive Decision-Making Process for Continuous Business Performance Optimization, a business entity is modelled as a cognitive system that interacts with its operating environment. Its operating environment is further described in two layers: an immediate transactional environment comprising of customers, suppliers, other partners, competitors and a broader contextual environment for example, location, climate, political system etc. While a business entity can exercise total control over its internal operations, it has only a partial influence over its transactional environment. A business can engage into collaborations, negotiations, and contractual agreements with the actors in its transactional environment and thereby influence it directly by its actions to expect somewhat predictable outcomes. The business itself is impacted by the actions of actors in its transactional environment in all sorts of ways. The business entity is also impacted by its contextual environment but has no direct control over it though there may be some indirect influence, for example, contributing to pollution.

In the Cognitive Decision-Making Process for Continuous Business Performance Optimization, a business entity modelled as a cognitive system continuously senses its environment for opportunities and responds to opportunities via internal facing actions and/or external facing actions (toward its environment) to produce expected outcomes in its favor. Further, the opportunities arise because of unexpected fluctuations in the internal operations of the business or in the transactional or contextual environment. Without a cognitive decision-making process in place, many of these opportunities go unnoticed or revealed when there is time left to address those. The present subject matter makes these opportunities visible in time and recommends strategies to address the opportunities in the best possible way with quantifiable expected outcomes.

In one implementation, the process of sensing and generating an intelligent and effective response is a cognitive decision-making process can be deployed to continuously optimize business performance. The proposed methodology for the cognitive decision-making process is referred to as SEAL which is an acronym derived from four phases of the methodology: Sense, Explore, Act, and Learn.

In one embodiment, the present subject matter describes, a four-phased cognitive decision-making process framework (or Methodology), called SEAL. In SEAL, an opportunity (instance) is created in the SENSE phase and flows through other phases and completes its life cycle in the LEARN phase.

In one example, in the SENSE Phase, data from internal and external sources is received on a continual basis and analyzed for fluctuations that may give rise to opportunities. This requires establishing connections to all pertinent data sources to sense opportunities; receiving the data regularly, and analyzing the data using time-series analytics, and other predictive analytics (machine learning) method 102 to predict the violation of business state invariants corresponding to all pre-defined opportunity types. When an invariant violation is sensed, a new opportunity instance of the corresponding opportunity type is created and the user (business manager/decision-maker) is notified. The sensing, creation, and notification of opportunity can be fully automated. The user waits for opportunity notifications. When the user logs into the system (user may also be notified by some alerting or messaging mechanism), user can see a new opportunity instance. Upon receiving the notification, user acknowledges the receipt of the opportunity instance, which now moves to EXPLORE Phase (31).

In one example, in EXPLORE phase, additional analysis (using a combination of predictive, prescriptive and optimization techniques) is performed for the purpose of recommending the best possible strategy to address the current opportunity. This analysis, like sensing, can also be fully automated. The recommendation is then presented to the user via user interface (desktop or mobile) who can now review the recommendation and potentially make additional tweaks in it and/or collaborate with other users to finalize the strategy for subsequent implementation. User can also be provided with automated visual exploration tools to explore variations (for example, what-if-scenario-analysis) of the recommended strategy. After the user finalizes the strategy, the opportunity instance moves onto ACT phase (32). Further, several variations are possible in the EXPLORE Phase to finalize the strategy. Furthermore, few examples are listed below 1. More than one user may be involved in finalizing the strategy. For example, one user may forward the strategy for approval by one or more other users. In other words, users may collaborate in various ways to finalize the strategy. But in all cases, the starting point is the strategy that is recommended automatically by the system
2. Several opportunity instances may be clubbed together to be addressed by a single strategy.
3. One opportunity instance may supersede another opportunity instance if these are related in a way such that addressing one also takes care of the other.

In one example, in ACT Phase, actionable guidance (set of instructions with accompanying information) is generated for each actors (users or programs) to implement the finalized strategy in the EXPLORE phase. The guidance generation can be fully automated or performed with user in the loop. Human actors can be notified of their responsible by a multiplicity of communication mechanisms. Automatic actors (programs) can be automatically invoked to perform the actions as per the actionable guidance. After, all the actors are assigned their responsibilities to address the opportunity, the opportunity moves to the LEARN Phase.

In one example, in the LEARN phase, all information pertaining to the previous phases is archived for future analysis. When the strategy has been fully implemented by the actors of ACT phase and the outcome of the implementation becomes evident from the changes noticed in future business state, then the expected outcomes are compared with the actual outcomes and the discrepancies between the two are used to fine tune various parameters of analytic method 102 to improve the accuracy and confidence of method 102 in SENSE, EXPLORE, and ACT phases. Opportunity at this time completes its life cycle and can be archived. Activities in the LEARN phase can be fully automated or performed in cohort with the user.

Referring now to FIG. 1, a network implementation 100 of an opportunity driven system 102 for sensing of opportunity in a cognitive decision-making process is disclosed. It may be understood that the present disclosure is explained considering that the opportunity driven system 102 is implemented on a server 110. It may be understood that the opportunity driven system may be implemented in a variety of computing systems, such as a mobile communication device (such as a smartphone), a laptop computer, a desktop computer, a notebook, a workstation, a mainframe computer, a server, a network server, and the like. It will be understood that the opportunity driven system 102 may be accessed by multiple users through one or more user devices 104-1, 104-2 . . . 104-N. Examples of the user devices 104 may include, but are not limited to, a portable computer, a personal digital assistant, a handheld device, and a workstation. The user devices 104 are communicatively coupled to the opportunity driven system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may be either a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
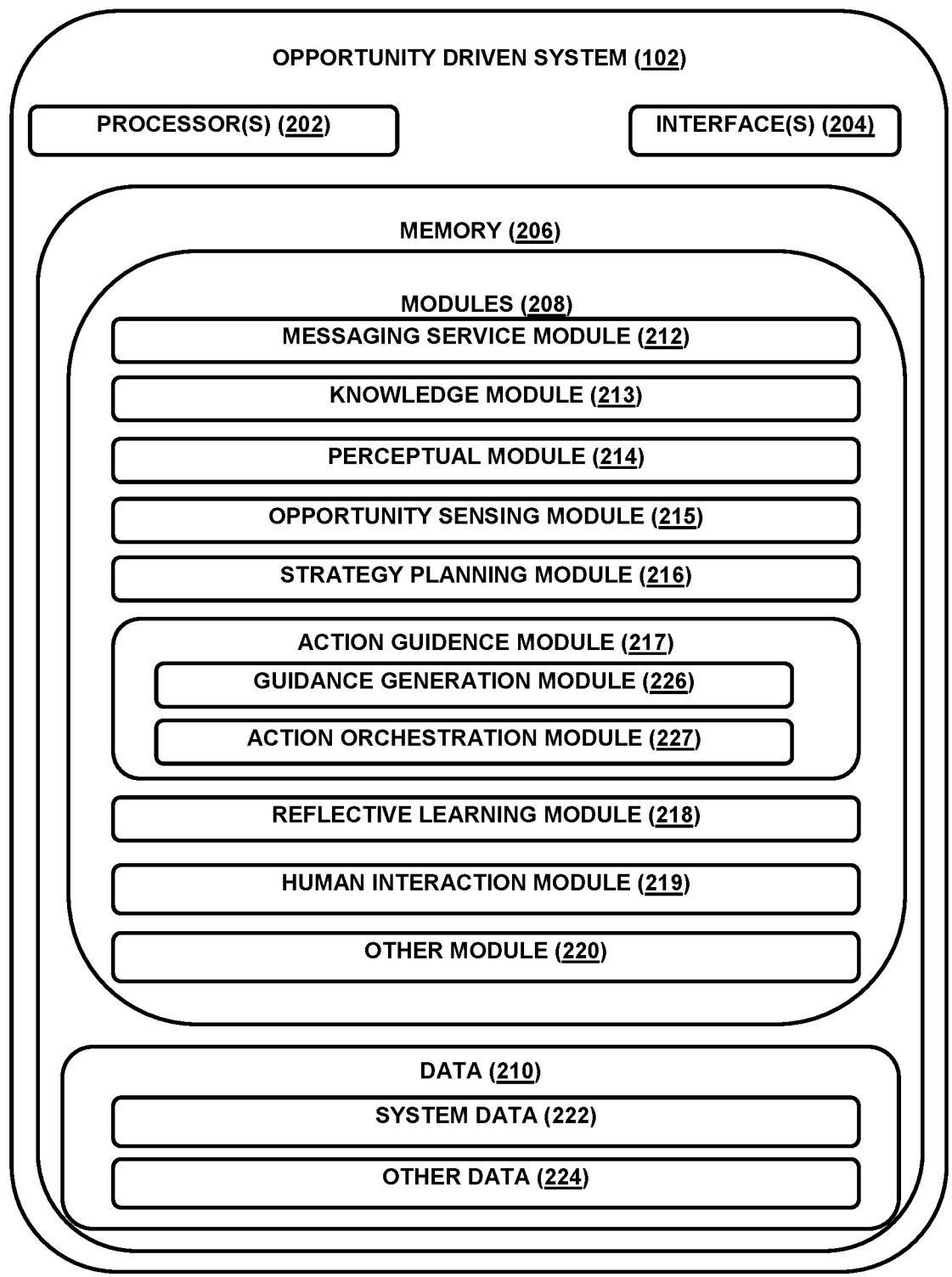
FIG. 2 illustrates the opportunity driven system for continuous business optimization of an organization based on a cognitive decision-making process, in accordance with an embodiment of the present subject matter.

Referring now to FIG. 2, the opportunity driven system 102 for sensing of opportunity in a cognitive decision-making process is illustrated in accordance with an embodiment of the present subject matter. In one embodiment, the opportunity driven system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the opportunity driven system 102 to interact with the user directly or through the client devices 104. Further, the I/O interface 204 may enable the opportunity driven system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random-access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a messaging service module 212, a knowledge module 213, a perceptual module 214, an opportunity sensing module 215, a strategy planning module 216, an action guidance module 217, reflective learning module 218, human interaction module 219 and other modules 220. Further, the action guidance module 217 comprises a guidance generation module 226, and an action orchestration module 227. The other modules 220 may include programs or coded instructions that supplement applications and functions of the opportunity driven system 102. The modules 208 described herein may be implemented as software modules that may be executed in the cloud-based computing environment of the opportunity driven system 102.

The data 210, amongst other things, serves as a repository for storing data processed, received, and generated by one or more of the modules 208. Further, the data may include system data 222, and other data 224. The other data 220 may include data generated because of the execution of one or more modules in the other modules 220.

In one implementation, the system 102 addresses the challenges observed in the existing art. In one embodiment, the opportunity driven system 102 enables continuous business optimization in cognitive decision-making process. In the embodiment, the modelling the organization as an opportunity driven system configured to cognitively sense one or more parameters associated with its business and executed one or more actions. In one example, the one or more parameters may be internal or external to the organization.

In the embodiment, the perceptual module 214 may receive a stream of raw data from one or more sources internal or external to the organization. In one example, if the organization is a store such as Walmart™, the sources may be the data from the point of sale machine, ERP system, supply chain system, local news, competitor data and the like. Upon receiving the perceptual module 214 may filtering a noise data from the stream of raw data using the one or more patter recognition algorithm. In one example, the pattern recognition may also be known as symptoms indicate of a business opportunity, for example if the business opportunity is "preventing costumer churn" the symptom i.e. the pattern the perceptual module 214 may filter is customer who have not bought from last 5 days, where the "last 5 day" parameter is derived from historical data. Upon filtering, the perceptual module 214 may collect the filtered data for one of a predefined time interval, or a predefined data size based on the type of symptom. Further to collecting, the perceptual module 214 may reorganize the filtered data using the one or more data structures. In one example, the data structure may comprise a template, instructions, or column-row definitions. In the example, of the "preventing customer churn" the filtered data may be reorganized in customer name date of purchase, amount of spend, items bought and the like. Further to reorganizing the perceptual module, 214 may generate an opportunity input data package based on the collection of filtered and organized data.

In the embodiment, upon generating of the opportunity input data package the opportunity sensing module 215 may identify the business opportunity for the set of business opportunities based on analysis of the opportunity input data package. In one example, the identifying the opportunity input data package may obtain data from the knowledge module 213. In one example, the data may comprise historical data, trend data and the like. Further, in one other example, the analysis may comprise one or more of a time-series analysis, an incremental analysis, a prediction model, a computational model. Further, the prediction model and the computational model may be generated using a machine learning methodology and historical data. Upon identifying, the opportunity sensing module 215 may generate a reason for identifying the business opportunity based on analysis of the opportunity input data package and append the reason to the opportunity instance package.

Refereeing to the business opportunity "preventing costumer churn", the opportunity input package may comprise a list of customers who have not bought from last 5 days. Further, the opportunity sensing module 215 may obtain data associated with the customers such as historical data and trend data and eliminate the customers who regularly buy post 5 days, thus identifying list of customers who may churn. Upon identifying the opportunity sensing module 215 may generate a reason, such as "customer is a student and is travelling" based on the analysis of the data, such as the calendar and timetable of the university located close to the mall, from the knowledge module 213. Further, the opportunity sensing module 215 may generate a reason "no reason identified" if no reason is identified when the data is analyzed and shortlist the business opportunities with this reason for further steps. Further, the opportunity sensing module 215 may and append the reason to the opportunity instance package.

In the embodiment, the opportunity sensing module 215 may synthesis the identified business opportunity into a business opportunity document i.e. from a machine-readable format to a human readable format using one of a natural language generating methodology and predefined templates, the opportunity instance package. Further, the business opportunity document may comprise graphs, images, or videos to explain the business opportunity to a user. Further, the human interaction module 219 may display the business opportunity document and obtain user input. The user input may be acceptance, rejection or modification of the business opportunity. In one example, the user may modify the business opportunity document. Further, the opportunity sensing module 215 may sense the modification and do analogous modification in the opportunity instance package associated with the business opportunity document.

In the embodiment, the strategy planning module 216 may generate a strategy using the opportunity instance package, user input, and one or more of a predictive technique, prescriptive technique and optimization technique. Referring to the example of the "preventing customer churn" the strategy planning module 216 may generate a strategy such as "execute a discount promotion of 20%". In the embodiment, the strategy planning module 216 may synthesize the strategy in to a strategy document i.e. from a machine-readable format to a human readable format using one of a natural language generating methodology and predefined templates, the opportunity instance package. Further, the strategy document may comprise graphs, images, or videos to explain the strategy to a user. Further, the human interaction module 219 may display the strategy document and obtain user input. The user input may be acceptance, rejection or modification of the strategy. In one example, the user may modify the strategy document. Further, the strategy planning module 216 may sense the modification and do analogous modification in the strategy.

In the embodiment, upon generating the strategy, the action guidance module 217 may generate a set of instruction associated with one or more actors associated with the organization based on the strategy, thereby enabling continuous business optimization of an organization based on a cognitive decision-making process. In one example, the one or more actors may be one of an employee of the organization, or a computer program associated with the organization. Referring to the example, of "preventing the business churn" the action guidance module 217 may generate an instruction for the mailer program to send discount mails to the customers with mail id in the opportunity instance data package. Further, the action guidance module 217 may generate an instruction for the marketing and sales team to do a promotion activity in the mall regarding the discount.

Further, in the embodiment, the reflective learning module 218 may track an implementation of the set of instruction. Furthermore, the reflective learning module 218 may compute an expected outcome based on the set of instructions and the strategy, and generate an actual outcome based on analysis of the stream of raw data, received post implementation of the set of instructions. Upon generating, the reflective learning module 218 may compute a deviation based on a comparison of the expected outcome and the actual outcome and identifying one or more predefined instruction or pattern recognition algorithm, to be modified if the deviation is over a predefined threshold.

Figure 3:
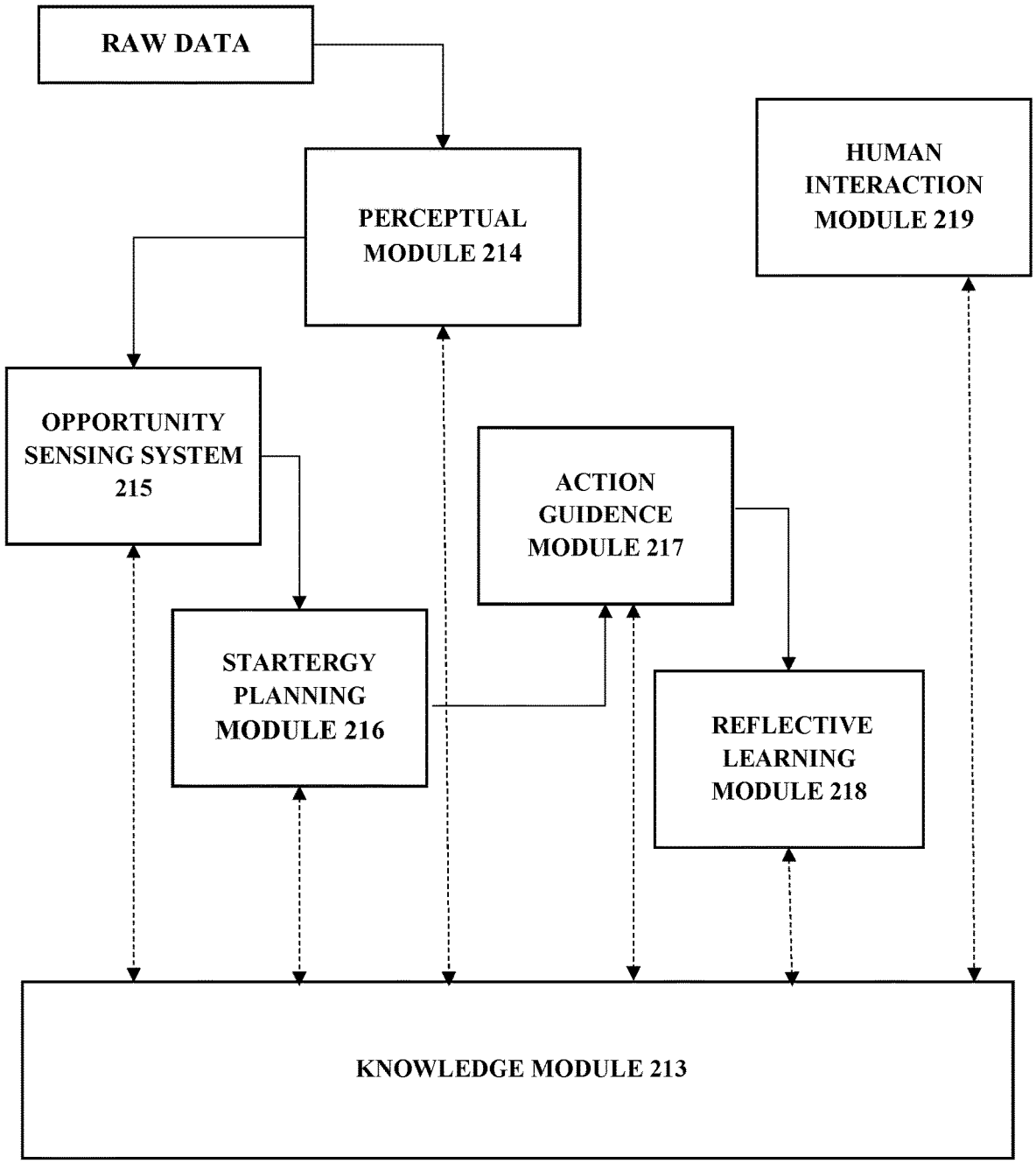
FIG. 3 illustrates a message flow of the opportunity driven system for continuous business optimization of an organization based on a cognitive decision-making process, in accordance with an embodiment of the present subject matter.

Now referring FIG. 3, FIG. 3 illustrates a message flow in the opportunity driven system 102. Further, the succeeding detailed description of the opportunity driven system 102 along with other components, their interactions is explained by referring to FIG. 2 and FIG. 3.

The opportunity driven system (ODS 102) 102 for continuous business optimization implements the SEAL cognitive decision-making process creating a man-machine symbiotic system, which automates many aspects of SEAL and implements others in cohort with the user. Furthermore, in addition to the SEAL process, the opportunity driven system 102 for continuous business optimization also involves a fast decision-making process, which bypasses standard SEAL phases, is fully automated and does not require any deliberative planning or user intervention. This fast decision-making process is useful for making routine and well-understood decision-making more efficient and for situations where a quick response is critical.

In one implantation, ODS 102 is an intelligent, adaptable, and modular system. A module of ODS 102 is a knowledge-driven software system, which adapts itself as its underlying knowledge changes. The cognitive properties of ODS 102 emanate from the ability of its modules to learn, adapt, and exhibit context specific behavior at execution time. Furthermore, the knowledge-driven structure and behavior of modules allows ODS 102 to work with arbitrary opportunity types and domains, by simplifying its knowledge base. Further, the ODS 102 interacts with knowledge in two ways. Firstly, the structure and behavior of the ODS 102 is governed by a knowledge specification. Secondly, the ODS 102 accesses, updates, and creates knowledge objects. These knowledge objects may themselves serve as specifications of other objects.

The knowledge specification of ODS 102 may have static and dynamic parts. The difference in the static and dynamic parts is in how the changes in those parts are handled. A change in the static part of a specification after the ODS 102 has started is observed only when the ODS 102 is stopped and restarted, whereas the changes in dynamic parts can be observed and thereby influence the behavior of the ODS 102 while the ODS 102 is still running. The knowledge specifications when read into memory are instantiated as shared knowledge objects. When persisted, these specifications may be serialized in XML, JSON, or any other format.

In one example, ODS 102 itself may contain other component modules, creating a nested structure of modules. Likewise, the knowledge specification of ODS 102 will refer to knowledge specification of its component modules, thereby creating a knowledge graph structure.

Further, in the implementation, the component modules in ODS 102 run asynchronously and concurrently, independent of each other. To implement the SEAL process, component modules communicate and collaborate using asynchronous message passing and by operating on shared knowledge objects whose references themselves are made accessible through message exchanges.

Messaging Service Module 212

In the implementation, the message service module 212 provides a common mechanism that is used by all core modules to asynchronously exchange messages among each other. The message service module 212 maintains a number of message queues. In one example, a message queue has the following properties:

Component modules subscribe to a message queue as producers and/or consumers

There may be multiple producers and consumers associated with the same message queue.

Producers subscribed to a message queue append messages at the end of the queue

Consumers subscribed to a message queue read message from the front of the queue in the order in which they were appended.

A message may have semantics that it can be only read by at most one consumer. In this case, the message is removed from queue (discarded) as soon as a consumer reads it.

Alternatively, the message may have semantics that allows it to be read by multiple consumers. In this case, message is removed from the queue only when the maximum numbers of allowable consumers have read the message.

The message queues remain in memory for quick access but are also saved on storage for failure recovery and analysis purposes.

Messages may also be discarded from the queue after a pre-defined time window, even if the required number of consumers has not read it.

A message queue is types in the sense that it only handles messages of the same type.

A message type is defined by a message type specification, which describes what information can be carried in a message of that type.

Further, table 1 illustrates an exemplary (partial) message type specification schema. Message type specification schemas are maintained in a Knowledge Module and can be obtained from Knowledge Module as needed. Opportunity Driven System 102 has a well-defined collection of Message Type Specifications stored in the Knowledge Module. Additional message type specifications can be added and the existing ones can be modified or deleted from the Knowledge Module programmatically through an API or an administrative user interface. Furthermore, table 2 illustrates example of a message specification schema

TABLE 1

Example of a Message Type Specification Schema
Message Type Specification Schema

| # | Field name | Description |
| --- | --- | --- |
| 1 | M-Type-Id | Unique Identifier of message type to distinguish it from other message types |
| 2 | M-Type-Label | Unique Label of message type |
| 3 | M-Type-Body-Schema | Schema of the message body describing the structure of information to be carried out by messages of this type |
| 4 | M-Type-Mode (optional) | Messages are of two modes-Request or Response. This could be implicit in the message label or made explicit using this field. |

TABLE 2

Example of a Message Specification Schema

Message Specification Schema

| # | Field name | Description |
| --- | --- | --- |
| 1 | M-Id | Unique Identifier of message to distinguish from other messages |
| 2 | M-Type-Id | message type to which this message belongs |
| 3 | M-Time-Stamp | Time when message was appended to queue |
| 4 | M-Producer-Id | Unique Identifier of the Module which produced this message |

TABLE 2-continued

Example of a Message Specification Schema

Message Specification Schema

| # | Field name | Description |
|---|---|---|
| 5 | M-Consumption-Code | To record whether the message has been read or not or by how many. |
| 6 | M-Body-Container | Placeholder for message content following M-Type-Body-Schema |
| 7 | M-Request-Status | Messages are of two modes-Request or Response. This field provides a quick status type value |
| 8 | M-Response-Status | This field provides a status type value for the response. |

Knowledge Module 213

In the implementation, the Knowledge Module 213 is responsible for maintaining all declarative and procedural knowledge in the ODS 102, which is required by all other components in ODS 102. The modules 208 interact among each other by sharing common knowledge. The knowledge in the knowledge module 213 is represented in a collection of SEAL ontology and domain specific ontologies to capture all knowledge about opportunity types, opportunity instances, users, system configuration, and parameters and hyper-parameters of analytic methods.

Further, the Knowledge Module 213 provides querying APIs to query and updates knowledge. Knowledge module 213 caches the knowledge into an in-memory database and stores the knowledge in one or more SQL, NO-SQL, and semantic graph databases.

Perceptual System Module 214

In the implementation, the perceptual system module 214 is the gateway to the ODS 102 for receiving all data streams into the ODS 102 from one or more data sources. The perceptual system module 214 is responsible for making the required connections to the data sources to receive data. The perceptual system module 214 prepares data packages from the continually arriving data streams in pre-defined structures appropriate for consumption by other components. Such a package is called an opportunity input data package. Thus, from the streams of raw data received from multiple data sources, perceptual system module 214 outputs a stream of opportunity input data packages. In producing an opportunity input data package, perceptual system module 214 may clean/filter and transform the data into the required shape suitable for consumption by other components. The main consumer of opportunity input data packages is the Opportunity Sensing Module 215, but the Human Interaction Module 219 or Reflective Learning Module 218 may also directly consume some of the opportunity input data packages.

In addition to producing opportunity input data packages, the perceptual system module 214 is also responsible for initiative fast decision-making process, referred to as reactive processes. These reactive processes may also consume opportunity input packages.

Opportunity Sensing Module 215

The Opportunity Sensing Module 215 implements the SENSE phase of SEAL cognitive decision-making process. The opportunity sensing module 215 receives the opportunity input data packages from the perceptual system module 214 and performs analysis on these to detect patterns to sense opportunities of pre-defined opportunity types. To perform the analysis, opportunity sensing module 215 may do time-series or incremental analysis on opportunity input data packages and/or deploy models, which are created by machine learning algorithms using historical record of opportunity input data packages. The opportunity sensing module 215 also performs analysis to determine, if the models need to be re-learned to improve the accuracy of predictions.

If an opportunity is sensed/predicted, the opportunity sensing module 215 initiates a new opportunity and creates an opportunity instance package to be consumed by Strategy Planning Module 216, Human Interaction Module 219 and Reflective Learning Module 218. Further, the opportunity Sensing Module 215 can also update an already existing opportunity instance package, if it finds new information in the incoming opportunity input data packages which may impact a prior opportunity instance which is still active in the SEAL process.

Strategy Planning Module 216

The Strategy Planning Module 216 implements the EXPLORE phase of SEAL cognitive decision-making process. The Strategy Planning Module 216 receives the opportunity instance package from Opportunity Sensing Module 215, performs additional analytics to recommend the best possible strategy to address the business opportunity, and inserts the strategy information into the opportunity instance package. The enhanced opportunity instance package is now made available to Human Interaction Module 219.

Further, Strategy Planning Module 216 in cohort with Human Interaction Module 219 produces a finalized strategy, which may require additional what-if-scenario-analysis and collaboration. The opportunity instance package is updated to include the finalized strategy information and is made available to Action Guidance Module 217.

Action Guidance Module 217

In one example, the Action Guidance Module 217 implements the ACT phase of SEAL cognitive decision-making process. The Action Guidance Module 217 receives the Opportunity Instance Package (including finalized strategy) from the Strategy Planning Module 216 and using knowledge about the business domain, for example from the knowledge module 213, synthesizes actionable step by step guidance and instructions which can be systematically performed by one or more actors to implement the recommended strategy in practice. The actors may be a human or a program associated with the organization.

The synthesis of actionable guidance can be fully automatic or may involve user to extend or customize the auto-generated guidance. The opportunity instance package is further enhanced to include actionable guidance and is made available to Human Interaction Module 219 and Reflective Learning Module 218.

In one example, the Action Guidance Module 217 is responsible for wrapping the action context around an optimal strategy arrived by Strategy Planning Module 216 and ensuring that the strategy is implemented to deliver the expected outcome. Action Guidance module 217 can also be seen as and elaboration of Strategy aligned to the current operational processes and resources.

In one example, the output of Action Guidance Model 217 is Action Guidance that is an Action schedule/project plan—a collection of entries where each entry has the following attributes:
 1. Action Description
 2. Action Guidance
 3. Action Dependencies
 4. Earliest Start Time
 5. Latest Start Time
 6. Expected Time to Finish Task
 7. Roles accountable and responsible for the task Action Guidance Module can be implemented on a single machine or a cluster of machines. These internal components and their interactions are described next. In doing its activity, Action Guidance Module 217 uses two sub-modules—Guidance Generation Module 226 and Action Orchestrator Module 227.

In the implementation, the guidance generation module 226 is responsible for generating the complete action guidance. For each strategy type, the guidance generation module 226 stores a collection of Action Guidance Templates with certain attributes. Further, guidance generation module 226 performs selection of appropriate template and filling it with the values of decision variables and current operational context.

In one implementation, Action Orchestration Module 227 is responsible for assigning tasks to individual actors and notifying them with. Action Orchestration Module 227 also keeps track of dependencies; it can send alerts, etc.

Reflective Learning Module 218

The Reflective Learning Module 218 implements the LEARN phase of SEAL cognitive decision-making process. The Reflective Learning Module 218 is responsible for development of models, which are used in SENSE and EXPLORE phases. The reflective learning module 218 also monitors whether or not a model needs to be retrained to account for changes in the environment. In addition, the Reflective Learning Module 218 also learns hyper parameters of the models. Model development for the pre-defined opportunities and data streams can be fully or partially automated. Further, new models automatically replace the old models without requiring any changes in other modules.

Human Interaction Module 219

Human Interaction Module 219 collaborates with other components in the ODS 102 and users to create a man-machine symbiotic system, which allows users to participate in the cognitive decision-making process while benefiting from automated opportunity analysis provided by the ODS 102. The Human Interaction Module 219 caters to broadly three personas by providing a separate interaction interface for each. Three personas are:
 Knowledge Managers—Users who are responsible for managing knowledge specifications, participating in model development, and for managing the overall integrity of the system.
 Decision Makers—These are business managers who participate in the cognitive decision-making process by observing opportunities, customizing and approving decisions.
 Action Implementers—These users perform actual actions to implement decisions approved by decision-makers.

An individual can assume more than one persona, depending on their job function in the organization. Users, regardless of persona interact, with ODS 102 via Human Interaction Module, using a browser or mobile app based user interface from a variety of devices.

In one example, the table 3 illustrates the Top-level messages types used for intercommunication among core modules. Further, table 4 illustrates top-level knowledge objects frequently referenced in ODS 102.

TABLE 3

Top-level messages types used for intercommunication among core modules
Key Top-Level Message Types

| # | Message Type | Producer Module | Consumer Module | Description |
|---|---|---|---|---|
| 1 | Sensing-Start | Perceptual System Module 214 | Opportunity Sensing Module 215 | This message is produced by Perceptual System Module and contains the reference to a new Sensory Input Knowledge Object. The purpose of this message is to indicate that a new batch of input is ready for opportunity sensing. The Opportunity Sensing Module consumes the message. |
| 2 | Strategy-Start | Opportunity Sensing Module 215 | Strategy Planning Module 216 | This message is produced by Opportunity Sensing Module and contains the reference to a new Opportunity Instance Knowledge Object. The purpose of this message is to indicate that a new opportunity has been sensed and ready for strategy planning. The Strategy Planning Module consumes the message. |
| 3 | Action-Start | Strategy Planning Module 216 | Action Planning Module 217 | This message is produced by Strategy Planning Module and contains the reference to the same Opportunity Instance Knowledge Object it received in the strategy message but with strategy knowledge also added to it. The purpose of this message is to indicate that strategy for the new opportunity has been finalized and is now ready for implementation. The Action Guidance Module consumes the message. |
| 4 | Learning-Start | Action Planning Module 217 | Reflective Learning Module 218 | This message is produced by Action Guidance Module and contains the reference to the same Opportunity Instance Knowledge Object it received in the action message but with action knowledge also added to it. The purpose of the message is to indicate that Opportunity can now be inactivated and archived for learning purposes. |
| 5 | Strategy-Customize | Human Interaction Module 219 | Strategy Planning Module 216 | This message is triggered when user (decision-maker) wants to customize the automatically recommended strategy. |
| 6 | Strategy-Customization-Done | Strategy Planning Module 216 | Human Interaction Module 219 | This message is emitted when the customization of strategy is complete. |

TABLE 3-continued

Top-level messages types used for intercommunication among core modules
Key Top-Level Message Types

| Message # | Message Type | Producer Module | Consumer Module | Description |
|---|---|---|---|---|
| 6 | Strategy-Approved | Human Interaction Module 219 | Strategy Planning Module 216 | This message is triggered when user (decision-maker) approves a strategy. The approval of strategy takes the opportunity to ACT phase. |

TABLE 4 top-level knowledge objects frequently referenced in ODS 102
Examples of Top Level Knowledge Objects

| # | Knowledge Object Type Label | Instantiating Module | Description |
|---|---|---|---|
| 1 | OTS-KO (Opportunity Types Knowledge Object) | Knowledge Module 213 | Contains the specification of all opportunity types in the Opportunity Driven System. This is the very first object instantiated in memory by the Knowledge Module. |
| 2 | OT-KO | Knowledge Module 213 | Contains the specification of a single opportunity type. OTS-KO will contain reference to OT-KO for each opportunity in the system |
| 3 | OI-KO (Opportunity Input knowledge object) | Perceptual Module 214 | SI-KO encapsulates a batch of input data for opportunity sensing as per the specifications of opportunity sensing for opportunity types. |
| 4 | OX-KO (Opportunity Instance Knowledge Object) | Opportunity Sensing Module 215 | This object captures all information pertaining to an individual opportunity instance. When created, it will have reference to the corresponding opportunity type knowledge object, OT-KO as well as to SI-KO. |
| 5 | OS-KO(Opportunity Strategy Knowledge Object) | Strategy Planning Module 216 | This object captures all information pertaining to the strategy developed for addressing the opportunity. This object will have a bi-directional link to the corresponding OX-KO. |
| 7 | OA-KO(Opportunity Action Knowledge Object) | Action Guidance Module 217 | This object captures all information pertaining to action guidance associated with a strategy. |

In the implementation, opportunity driven system 102 function in multiple phases such as initiation phase, execution phase termination phase. In one example, below description explains an overview of the behavior of the opportunity driven system 102 through various phases. In one example of the initialization phase, upon start opportunity driven system 102 performs the following initialization activities.

1. Start logging service to record run time activity of all modules
2. Start monitoring service to catch runtime errors
3. Start Messaging Service
Using the above Messaging Service, set up the following message queues:
  a. Sensing-Start messages queue
  b. Strategy-Start messages queue
  c. Action-Start messages queue
  d. Learning-Start messages queue
4. Start management and administration service
/*Start all component modules*/
5. Start Knowledge Module (600)
6. Using Knowledge Module, get reference to OTS-KO
7. Start all other component modules (shown in FIG. 5), passing them the reference to OTS-KO.
/*Let knowledge module bring up the Opportunity Type*/
In one example, during execution the following services are active listening for messages from component modules
/*Logging Service*/
8. Upon receiving a logging request, get the log content and append it to the corresponding log file.
9. Upon receiving a log record access request, provide access to log file.
/*Monitoring Service*/
10. Upon receiving an exception message from a component module, log the message and initiate exception-handling mechanism in the pertinent modules.
11. Upon receiving a monitoring status request, provide pertinent monitoring data to the requestor (administration service or other component modules.
/*Messaging Service*/
12. Upon receiving a new message queue request, set up a new message queue.
13. Upon receiving a producer registration request, associate the requestor as the producer of the message queue in question.
14. Upon receiving a consumer registration request, associate the requestor as the consumer of the message queue in question.
15. Upon receiving a produce message request, append the message to the end of the message queue in question.
16. Upon receiving a consume message request, provide the message from the front of the message queue in question and remove the message from the queue if applicable.

In one example, on termination Opportunity Driven System 102 can be suspended and/or terminated by a command from the administration service. It can also be terminated by failures, which it cannot recover from by itself.

Exemplary embodiments for continuous business optimization of an organization based on a cognitive decision-making process discussed above may provide certain advantages. Though not required to practice aspects of the disclosure, these advantages may include those provided by the following features.

Some embodiments of the system and the method enable automated implementation of instruction for optimization of business.

Some embodiments of the system and the method continuous learning.

Some embodiments of the system and the method enable real time and quick identification of business opportunity.

Some embodiments of the system and the method enable generation of reason for why the business opportunity was identified and why the strategy was selected.

Figure 4:
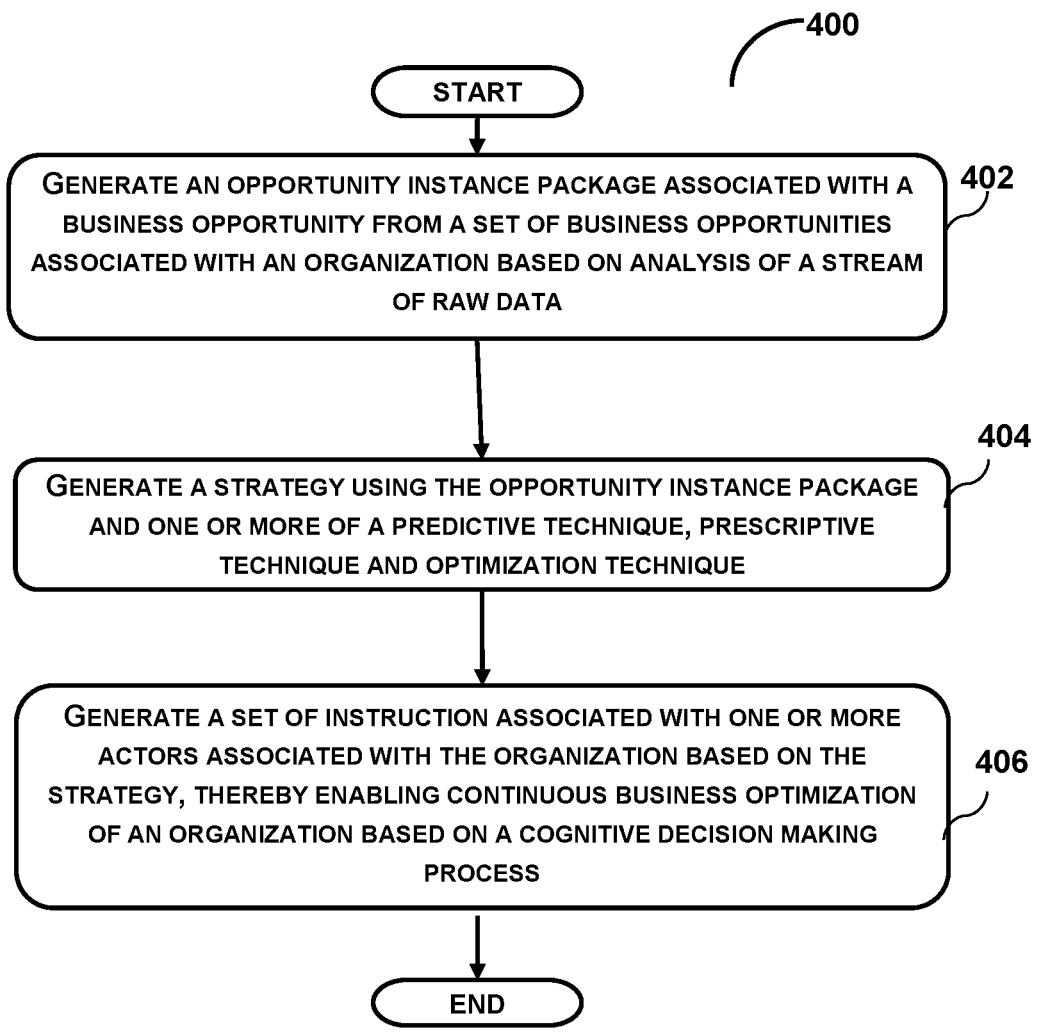
FIG. 4 illustrates a method for continuous business optimization of an organization based on a cognitive decision-making process, in accordance with an embodiment of the present subject matter.

Referring now to FIG. 4, a method 400 for continuous business optimization of an organization based on a cognitive decision-making process is disclosed in accordance with an embodiment of the present subject matter. The method 400 for continuous business optimization of an organization based on a cognitive decision-making process may be described in the general context of device executable instructions. Generally, device executable instructions can include routines, programs, objects, components, data structures, procedures, modules, functions, and the like, that perform particular functions or implement particular abstract data types. The method 400 for continuous business optimization of an organization based on a cognitive decision-making process may also be practiced in a distributed computing environment where functions are performed by remote processing systems that are linked through a communications network. In a distributed computing environment, computer executable instructions may be located in both local and remote computer storage media, including memory storage systems.

The order in which the method 400 for continuous business optimization of an organization based on a cognitive decision-making process is described is not intended to be construed as a limitation, and any number of the described method blocks can be combined in any order to implement the method 400 or alternate method 102. Additionally, individual blocks may be deleted from the method 400 without departing from the spirit and scope of the subject matter described herein. Furthermore, the method 400 can be implemented in any suitable hardware, software, firmware, or combination thereof. However, for ease of explanation, in the embodiments described below, the method 300 for continuous business optimization of an organization based on a cognitive decision-making process may be considered to be implemented in the above described an opportunity driven system 102.

At block, 402 an opportunity instance package associated with a business opportunity from a set of business opportunities associated with an organisation based on analysis of a stream of raw data may be generated. In one embodiment, the opportunity sensing module 215 may generate an opportunity instance package associated with a business opportunity from a set of business opportunities associated with an organisation based on analysis of a stream of raw data. Further, the opportunity sensing module 215 may store the opportunity instance package in the system data 222.

At block 404, a strategy using the opportunity instance package and one or more of a predictive technique, prescriptive technique and optimization technique may be generated. In one embodiment, the strategy-planning module 216 may a strategy using the opportunity instance package and one or more of a predictive technique, prescriptive technique and optimization technique. Further, the reflection module 212 may store the strategy in the system data 218.

At block 406, a set of instruction associated with one or more actors associated with the organization may be generated based on the strategy, thereby enabling continuous business optimization of an organization based on a cognitive decision-making process. In one example, the one or more actors may be one of an employee of the organization, or a computer program associated with the organization. In one embodiment, the action guidance module 217 may generate a set of instruction. Further, the action guidance module 217 may store the set of instruction in the system data 218.

Although implementations for method 102 and systems for continuous business optimization of an organization based on a cognitive decision-making process have been described in language specific to structural features and/or method 102, it is to be understood that the appended claims are not necessarily limited to the specific features or method 102 for continuous business optimization of an organization based on a cognitive decision-making process described. Rather, the specific features and method 102 are disclosed as examples of implementations for continuous business optimization of an organization based on a cognitive decision-making process.

We claim:

1. A method for continuous optimization of an organization based on a cognitive decision-making process, the method comprises:
   receiving, by a processor, a stream of raw data from one or more sources internal or external to an organization;
   generating, by the processor, an opportunity input data package based on an analysis of the stream of raw data using one or more predefined instructions, wherein the one or more predefined instructions comprise one or more data structures, and one or more pattern recognition algorithm associated with an opportunity from a set of opportunities, wherein the opportunity input data package is generated by:
   filtering noise data from the stream of raw data using the one or more pattern recognition algorithms to generate filtered data; and
   reorganizing the filtered data using the one or more data structures;
   identifying, by the processor, the opportunity from the set of opportunities based on an analysis of the opportunity input data package, wherein the analysis comprises one or more of a time-series analysis, an incremental analysis, a prediction model, and a computational model; wherein the prediction model and the computational model are generated using a machine learning methodology and historical data;
   generating, by the processor, an opportunity instance package associated with the opportunity from the set of opportunities associated with the organization based on the analysis of the stream of raw data, wherein the opportunity instance package indicates the filtered data associated to the opportunity;
   generating, by the processor, a strategy using the opportunity instance package and one or more of a predictive technique, a prescriptive technique and an optimization technique; and
   generating, by the processor, a set of instruction associated with one or more actors associated with the organization based on the strategy, thereby enabling continuous optimization of the organization based on a cognitive decision-making process, wherein the one or more actors is one of an employee of the organization, or a computer program associated with the organization.

2. The method of claim 1, further comprising
   tracking, by the processor, an implementation of the set of instruction;
   computing, by the processor, an expected outcome based on the set of instruction;
   generating, by the processor, an actual outcome based on analysis of the stream of raw data, received post implementation of the set of instructions;
   computing, by the processor, a deviation based on a comparison of the expected outcome and the actual outcome; and
   identifying one or more predefined instruction, to be modified if the deviation is over a predefined threshold.

3. The method of claim 1, further comprises modelling the organization as an opportunity driven system configured to cognitively sense one or more parameter and execute one or more actions, wherein the one or more parameters is internal or external to the organization.

4. The method of claim 1, further comprising:
synthesizing, by the processor, an opportunity document, and a strategy document from a machine readable format to a human readable format using one of a natural language generating methodology and predefined templates, and the opportunity instance package;
displaying, by the processor, the opportunity document and the strategy document to the user; and
modifying, by the processor, the opportunity and the strategy based on a user input.

5. The method of claim 1, wherein generating the opportunity input data package further comprises the step of collecting, by the processor, the filtered data for one of a predefined time interval, or a predefined data size.

6. The method of claim 1, further comprising
generating, by the processor, a reason for identifying the opportunity based on the analysis of the opportunity input data package; and
appending, by the processor, the reason to the opportunity instance package.

7. An opportunity driven system for continuous optimization of an organization based on a cognitive decision-making process, the system comprising:
a memory; and
a processor coupled to the memory, wherein the processor is configured to:
receiving a stream of raw data from one or more sources internal or external to an organization;
generating an opportunity input data package based on an analysis of the stream of raw data using one or more predefined instructions, wherein the one or more predefined instructions comprise one or more data structures, and one or more pattern recognition algorithm associated with an opportunity from a set of opportunities, wherein the opportunity input data package is generated by:
filtering a noise data from the stream of raw data using the one or more pattern recognition algorithms to generate filtered data; and
reorganizing the filtered data using the one or more data structures; and
identifying the opportunity from the set of opportunities based on an analysis of the opportunity input data package, wherein the analysis comprises one or more of a time-series analysis, an incremental analysis, a prediction model, and a computational model wherein the prediction model and the computational model are generated using a machine learning methodology and historical data;
generating an opportunity instance package associated with the opportunity from the set of opportunities associated with the organization based on the analysis of the stream of raw data, wherein the opportunity instance package indicates the filtered data associated to the opportunity;
generating a strategy using the opportunity instance package and one or more of a predictive technique, a prescriptive technique and an optimization technique; and
generating a set of instruction associated with one or more actors associated with the organization based on the strategy, thereby enabling continuous optimization of the organization based on a cognitive decision-making process, wherein the one or more actors is one of an employee of the organization, or a computer program associated with the organization.

8. The opportunity driven system of claim 7, further comprising tracking an implementation of the set of instruction;
computing an expected outcome based on the set of instruction;
generating an actual outcome based on analysis of the stream of raw data, received post implementation of the set of instructions;
computing a deviation based on a comparison of the expected outcome and the actual outcome; and
identifying one or more predefined instruction, to be modified if the deviation is over a predefined threshold.

9. The opportunity driven system of claim 7, further comprises modelling the organization as an opportunity driven system configured to cognitively sense one or more parameters and executed one or more actions, wherein the one or more parameters is internal or external to the organization.

10. The opportunity driven system of claim 7, further comprising:
synthesizing an opportunity document, and a strategy document from a machine readable format to a human readable format using one of a natural language generating methodology and predefined templates, the opportunity instance package;
displaying the opportunity document and the strategy document to the user; and
modifying the opportunity and the strategy based on a user input.

11. The opportunity driven system of claim 7, wherein generating the opportunity input data package further comprises the step of collecting the filtered data for one of a predefined time interval, or a predefined data size.

12. The opportunity driven system of claim 7, further comprising generating a reason for identifying the opportunity based on analysis of the opportunity input data package; and appending the reason to the opportunity instance package.

13. A non-transitory computer readable medium embodying a program executable in a computing device for continuous optimization of an organization based on a cognitive decision-making process, the program comprising a program code for:
receiving a stream of raw data from one or more sources internal or external to a organization;
generating an opportunity input data package based on an analysis of the stream of raw data using one or more predefined instructions, wherein the one or more predefined instructions comprise one or more data structures, and one or more patter recognition algorithm associated with an opportunity from a set of opportunities, wherein the opportunity input data package is generated by:
filtering a noise data from the stream of raw data using the one or more pattern recognition algorithms to generate filtered data; and
reorganizing the filtered data using the one or more data structures; and
identifying the opportunity from the set of opportunities based on an analysis of the opportunity input data package, wherein the analysis comprises one or more of a time-series analysis, an incremental analysis, a prediction model, and a computational model wherein the prediction model and the computational model are generated using a machine learning methodology and historical data;

generating an opportunity instance package associated with the opportunity from the set of opportunities associated with the organization based on the analysis of the stream of raw data, wherein the opportunity instance package indicates the filtered data associated to the opportunity;

generating a strategy using the opportunity instance package and one or more of a predictive technique, a prescriptive technique and an optimization technique; and generating a set of instruction associated with one or more actors associated with the organization based on the strategy, thereby enabling continuous optimization of the organization based on a cognitive decision-making process, wherein the one or more actors is one of an employee of the organization, or a computer program associated with the organization.

14. The non-transitory computer readable medium of claim 13, further comprises tracking an implementation of the set of instruction;

computing an expected outcome based on the set of instruction;

generating an actual outcome based on analysis of the stream of raw data, received post implementation of the set of instructions;

computing a deviation based on a comparison of the expected outcome and the actual outcome; and identifying one or more predefined instruction, to be modified if the deviation is over a predefined threshold.

15. The non-transitory computer readable medium of claim 13, further comprises modelling the organization as an opportunity driven system configured to cognitively sense one or more parameters and executed one or more actions, wherein the one or more parameters is internal or external to the organization.

16. The non-transitory computer readable medium of claim 13, further comprising:

synthesizing an opportunity document, and a strategy document from a machine readable format to a human readable format using one of a natural language generating methodology and predefined templates, the opportunity instance package;

displaying the opportunity document and the strategy document to the user; and modifying the opportunity and the strategy based on a user input.

17. The non-transitory computer readable medium of claim 13, wherein generating the opportunity input data package further comprises the step of collecting the filtered data for one of a predefined time interval, or a predefined data size.

18. The non-transitory computer readable medium of claim 13, further comprising generating a reason for identifying the opportunity based on the analysis of the opportunity input data package; and appending the reason to the opportunity instance package.

* * * * *